P. BROOKS.
KEY-RINGS.

No. 173,763.    Patented Feb. 22, 1876.

Witnesses:
J. K. Shumway
Clara Broughton

Peter Brooks,
Inventor
By Atty.
John J. Earle.

UNITED STATES PATENT OFFICE.

PETER BROOKS, OF WATERBURY, CONNECTICUT.

IMPROVEMENT IN KEY-RINGS.

Specification forming part of Letters Patent No. 173,763, dated February 22, 1876; application filed January 24, 1876.

*To all whom it may concern:*

Be it known that I, PETER BROOKS, of Waterbury, in the county of New Haven and State of Connecticut, have invented a new Improvement in Key-Rings; and I do hereby declare the following, when taken in connection with the accompanying drawings and the letters of reference marked thereon, to be a full, clear, and exact description of the same, and which said drawings constitute part of this specification, and represent, in—

Figure 1:
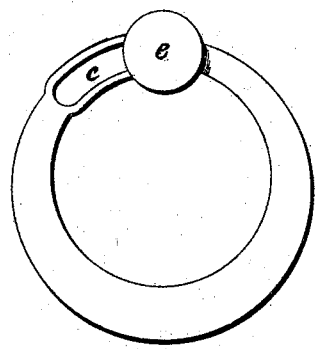
Figure 2:
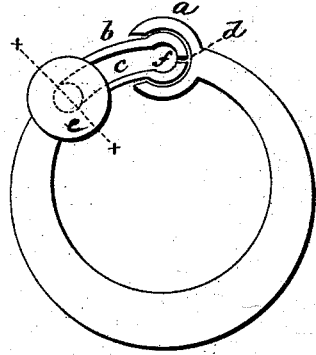
Figure 3:

Figure 1, face view as closed; Fig. 2, the same open; Fig. 3, transverse section on line $x\ x$.

This invention relates to an improvement in what are commonly called "key-rings"—that is to say, a device for securing several keys together for convenience of carrying in the pocket; and it consists in a divided ring, one end formed to receive within it a corresponding head upon the other end, the said other end constructed with a slot, and provided with a grooved collar, which freely moves in the said slot, and the said slot open at its end, and so that the said collar, when moved in the slot to cover the meeting ends, secures the two together, as more fully hereinafter described.

The ring is preferably made from sheet-metal. One of the meeting ends, $a$, is forked, the fork being more than a half-circle, or an equivalent for that, and the other end, $b$, formed corresponding to, and so as to lie within, the said forked end $a$, thus preventing any circumferential separation of the two parts.

The end $b$ is formed with a transverse slot, $c$, extending to within the extreme end, and the extreme end divided, as at $d$, the slot $c$ narrowing toward the end, but at the end of a larger diameter. Into this slot the locking-collar $e$ is placed. This collar consists of two heads with an annular groove between, the connection between the two heads being of a diameter larger than the smallest breadth of the slot $c$, and so that it may be forced from one end of the slot to the other, the heads lying, respectively, upon each side or face of the ring.

The collar being moved back from the head, as seen in Fig. 2, the ends may be separated laterally, so as to pass one end of the ring through the bow of the key; then the two ends are again brought together and the collar $e$ forced through the slot into the enlarged end $f$ of the slot, which brings the two heads of the collar over the surface of the two ends of the ring, as in Fig. 1, and thereby prevents a lateral separation, the sides of the slot yielding by their own elasticity for the connection of the heads to pass into the enlargement $f$ of the slot, and these closing again over the connection of the two heads prevents the accidental displacement of the collar.

The form of the forked end and of the collar are preferably made to correspond, so that when the ends of the ring are secured the collar appears as a boss on the ring.

To remove a key, or introduce others, the collar is forced back, as in Fig. 2, so as to leave the two ends free.

I claim—

The herein-described key-ring, consisting of a divided ring, one end of which is forked to surround a corresponding enlargement upon the other end, which is slotted, and combined with the annularly-grooved collar $e$, substantially as set forth.

PETER BROOKS.

Witnesses:
 C. S. ABBOTT,
 JOSEPH SPENDER.